US009776368B2

(12) United States Patent
Lewis et al.

(10) Patent No.: US 9,776,368 B2
(45) Date of Patent: Oct. 3, 2017

(54) PARTIAL-FILLED BAFFLE

(71) Applicant: Zephyros, Inc., Romeo, MI (US)

(72) Inventors: Keith Lewis, Macomb Township, MI (US); Blake Synnestvedt, Birmingham, MI (US); Jean Michael Coulon, Sherbrooke (CA); Todd R. Deachin, Goodrich, MI (US)

(73) Assignee: Zephyros, Inc., Romeo, MI (US)

( * ) Notice: Subject to any disclaimer, the term of this patent is extended or adjusted under 35 U.S.C. 154(b) by 0 days.

(21) Appl. No.: 14/666,821

(22) Filed: Mar. 24, 2015

(65) Prior Publication Data

US 2015/0190977 A1 Jul. 9, 2015

Related U.S. Application Data

(63) Continuation of application No. 13/796,399, filed on Mar. 12, 2013, now Pat. No. 9,010,843.
(Continued)

(51) Int. Cl.

| | |
|---|---|
| ***B60R 13/08*** | (2006.01) |
| ***B29D 99/00*** | (2010.01) |
| ***B62D 29/00*** | (2006.01) |
| ***B62D 21/09*** | (2006.01) |
| ***B32B 37/12*** | (2006.01) |
| ***B32B 37/14*** | (2006.01) |
| ***B32B 37/24*** | (2006.01) |

(Continued)

(52) U.S. Cl.
CPC .......... *B29D 99/0053* (2013.01); *B32B 37/12* (2013.01); *B32B 37/144* (2013.01); *B32B 37/24* (2013.01); *B32B 38/0004* (2013.01); *B60R 13/06* (2013.01); *B60R 13/08* (2013.01); *B60R 13/0815* (2013.01); *B62D 21/09* (2013.01); *B62D 29/002* (2013.01); *B32B 2305/022* (2013.01); *B32B 2307/102* (2013.01); *B32B 2581/00* (2013.01); *Y10T 156/1056* (2015.01)

(58) Field of Classification Search
CPC . B29D 99/0053; B60R 13/06; B60R 13/0815; B32B 2307/012; B32B 38/0004
USPC .................................................... 296/187.02
See application file for complete search history.

(56) References Cited

U.S. PATENT DOCUMENTS 625,559 A 5/1899 Keeler
4,751,249 A 6/1988 Wycech
(Continued)

FOREIGN PATENT DOCUMENTS

DE 3838655 A1 5/1990
DE 19856255 C1 3/1998
(Continued)

OTHER PUBLICATIONS

PCT Written Opinion of the International Preliminary Examining Authority dated May 26, 2014; Appln. No. PCT/US2013/030477.
(Continued)

*Primary Examiner* — Pinel Romain
(74) *Attorney, Agent, or Firm* — The Dobrusin Law Firm, PC

(57) ABSTRACT

A baffle for sealing a vehicle structure, comprising a carrier with an interior body portion characterized by a plurality of spaced-apart members, providing voids, and an expandable material, that may also have openings, disposed on the carrier which, upon expansion, fills a vehicle cavity and covers the interior body portion and each of the voids.

19 Claims, 2 Drawing Sheets

3 3 20 18 22 22 22 18 20 10 12 10 14 12 16

Related U.S. Application Data

(60) Provisional application No. 61/657,262, filed on Jun. 8, 2012.

(51) Int. Cl.
*B32B 38/00* (2006.01)
*B60R 13/06* (2006.01)

(56) References Cited

U.S. PATENT DOCUMENTS

| | | | |
|---|---|---|---|
| 4,813,690 | A | 3/1989 | Coburn, Jr. |
| 4,901,500 | A | 2/1990 | Wycech |
| 5,266,133 | A | 11/1993 | Hanley et al. |
| 5,358,397 | A | 10/1994 | Ligon et al. |
| 5,487,803 | A | 1/1996 | Sweeney et al. |
| 5,506,025 | A | 4/1996 | Otto et al. |
| 5,575,526 | A | 11/1996 | Wycech |
| 5,708,042 | A | 1/1998 | Hasegawa |
| 5,755,486 | A | 5/1998 | Wycech |
| 5,766,719 | A | 6/1998 | Rimkus |
| 5,931,474 | A | 8/1999 | Chang et al. |
| 5,932,680 | A | 8/1999 | Heider |
| 6,068,922 | A | 5/2000 | Vercesi et al. |
| 6,093,358 | A * | 7/2000 | Schiewe ............. B29C 44/1214 264/250 |
| 6,131,897 | A | 10/2000 | Barz |
| 6,150,428 | A | 11/2000 | Hanley et al. |
| 6,199,940 | B1 | 3/2001 | Hopton et al. |
| 6,207,244 | B1 | 3/2001 | Hesch |
| 6,270,600 | B1 | 8/2001 | Wycech |
| 6,276,105 | B1 | 8/2001 | Wycech |
| 6,287,666 | B1 | 9/2001 | Wycech |
| 6,296,298 | B1 | 10/2001 | Barz |
| 6,368,438 | B1 | 4/2002 | Chang |
| 6,389,775 | B1 | 5/2002 | Steiner |
| 6,413,611 | B1 | 7/2002 | Roberts |
| 6,422,575 | B1 | 7/2002 | Czaplicki |
| 6,455,146 | B1 | 9/2002 | Fitzgerald |
| 6,546,693 | B2 | 4/2003 | Wycech |
| 6,620,501 | B1 | 9/2003 | Kassa |
| 6,649,243 | B2 | 11/2003 | Roberts et al. |
| 6,706,772 | B2 | 3/2004 | Czaplicki |
| 6,758,738 | B1 * | 7/2004 | Keller ..................... B29C 44/12 428/71 |
| 6,786,533 | B2 | 9/2004 | Bock |
| 6,811,864 | B2 | 11/2004 | Czaplicki |
| 6,820,923 | B1 | 11/2004 | Bock |
| 6,846,559 | B2 | 1/2005 | Czaplicki |
| 6,920,693 | B2 | 7/2005 | Hankins |
| 6,926,784 | B2 | 8/2005 | Bock |
| 6,991,237 | B2 | 1/2006 | Kassa |
| 7,011,315 | B2 | 3/2006 | Czaplicki |
| 7,017,969 | B1 | 3/2006 | Kirkham et al. |
| 7,077,460 | B2 | 7/2006 | Czaplicki |
| 7,125,461 | B2 | 10/2006 | Czaplicki et al. |
| 7,169,467 | B2 | 1/2007 | Wilson |
| 7,199,165 | B2 | 4/2007 | Kassa et al. |
| 7,313,865 | B2 * | 1/2008 | Czaplicki ................ B29C 44/18 264/45.3 |
| 7,913,467 | B2 * | 3/2011 | Schneider ............ B62D 29/002 296/187.02 |
| 7,984,919 | B2 | 7/2011 | Nitsche et al. |
| 8,028,799 | B2 | 10/2011 | Hasler |
| 8,079,442 | B2 | 12/2011 | Wojtowicki |
| 8,087,916 | B2 | 1/2012 | Kanie et al. |
| 8,215,704 | B2 | 7/2012 | Monnet et al. |
| 8,293,360 | B2 | 10/2012 | Cousin et al. |
| 8,388,037 | B2 | 3/2013 | LaNore et al. |
| 8,444,214 | B2 | 5/2013 | Helferty |
| 8,469,143 | B2 | 6/2013 | Prunarety et al. |
| 2003/0045620 | A1 | 3/2003 | Carlson et al. |
| 2004/0011282 | A1 | 1/2004 | Myers et al. |
| 2004/0076831 | A1 | 4/2004 | Hable et al. |
| 2005/0260399 | A1 | 11/2005 | Finerman |
| 2006/0020076 | A1 | 1/2006 | Finerman |
| 2006/0073266 | A1 | 4/2006 | Myers et al. |
| 2007/0138683 | A1 | 6/2007 | Kanie |
| 2007/0193171 | A1 | 8/2007 | Finerman |
| 2008/0110694 | A1 | 5/2008 | Niezur |
| 2009/0001758 | A1 | 1/2009 | Hanley, IV et al. |
| 2009/0111371 | A1 | 4/2009 | Niezur et al. |
| 2010/0021267 | A1 | 1/2010 | Nitsche |
| 2010/0253004 | A1 | 10/2010 | Lehmann et al. |
| 2010/0320028 | A1 | 12/2010 | Wojtowicki |
| 2011/0057392 | A1 | 3/2011 | Monnet et al. |
| 2011/0063698 | A1 | 3/2011 | Liu et al. |
| 2011/0076435 | A1 | 3/2011 | Tachibana |
| 2011/0109003 | A1 | 5/2011 | LaNore et al. |
| 2011/0189428 | A1 | 8/2011 | Belpaire et al. |
| 2011/0192675 | A1 | 8/2011 | Lceroart et al. |
| 2012/0207986 | A1 | 8/2012 | Belpaire et al. |
| 2012/0295093 | A1 | 11/2012 | Belpaire et al. |
| 2013/0087406 | A1 | 4/2013 | Franey |
| 2013/0140731 | A1 | 6/2013 | Belpaire |
| 2013/0181470 | A1 | 7/2013 | LaNore et al. |

FOREIGN PATENT DOCUMENTS

| | | | |
|---|---|---|---|
| DE | 19648164 | A1 | 5/1998 |
| DE | 19812288 | C1 | 5/1999 |
| DE | 29904705 | U1 | 6/1999 |
| DE | 19835704 | A1 | 2/2000 |
| EP | 0383498 | A2 | 8/1990 |
| EP | 0697956 | B1 | 2/1996 |
| EP | 0730999 | A1 | 9/1996 |
| EP | 0893332 | A1 | 1/1999 |
| EP | 1031496 | A1 | 8/2000 |
| EP | 1122152 | A2 | 8/2001 |
| EP | 1149679 | A2 | 10/2001 |
| EP | 1435320 | A2 | 7/2004 |
| EP | 1935955 | A1 | 6/2008 |
| EP | 1975006 | A1 | 10/2008 |
| EP | 2113447 | | 10/2008 |
| EP | 1280658 | B1 | 8/2009 |
| EP | 2097308 | B1 | 9/2009 |
| EP | 2134799 | A1 | 12/2009 |
| EP | 2236358 | B1 | 10/2010 |
| EP | 2242634 | A1 | 10/2010 |
| EP | 2176113 | B1 | 4/2011 |
| EP | 2330019 | A1 | 6/2011 |
| EP | 2097308 | B1 | 7/2011 |
| EP | 2236358 | B1 | 8/2011 |
| EP | 2330019 | A1 | 8/2011 |
| EP | 2360002 | A1 | 8/2011 |
| EP | 2390077 | A1 | 11/2011 |
| EP | 2390077 | B1 | 11/2011 |
| EP | 2507116 | A1 | 10/2012 |
| EP | 2533961 | A1 | 12/2012 |
| EP | 2533961 | B1 | 12/2012 |
| EP | 2576176 | A1 | 4/2013 |
| EP | 1534561 | B1 | 8/2013 |
| EP | 2262633 | B1 | 9/2013 |
| GB | 903146 | A | 8/1962 |
| JP | 9328568 | A | 12/1997 |
| JP | H10297532 | A | 11/1998 |
| JP | 11-165598 | A | 6/1999 |
| JP | 2000052445 | A | 2/2000 |
| JP | 2000238589 | A | 9/2000 |
| JP | 2002221968 | A | 8/2002 |
| JP | 2002302066 | A | 10/2002 |
| JP | 2002331960 | A | 11/2002 |
| JP | 2002-347058 | A | 12/2002 |
| JP | 2002347058 | | 12/2002 |
| JP | 2003237624 | A | 8/2003 |
| JP | 2004-230834 | A | 8/2004 |
| JP | 2006-123710 | A | 5/2006 |
| JP | 2006224448 | A | 8/2006 |
| JP | 2002-347055 | A | 12/2014 |
| WO | 95/25085 | A1 | 9/1995 |
| WO | 97/02967 | A1 | 1/1997 |
| WO | 98/36944 | A1 | 8/1998 |
| WO | 98/50221 | A1 | 11/1998 |
| WO | 99/08854 | A1 | 2/1999 |

(56) References Cited

FOREIGN PATENT DOCUMENTS

| | | | |
|---|---|---|---|
| WO | 00/43253 | A | 7/2000 |
| WO | 00/46017 | A1 | 8/2000 |
| WO | 01/19667 | A1 | 3/2001 |
| WO | 01/54936 | A1 | 8/2001 |
| WO | 01/83206 | A1 | 11/2001 |
| WO | 01/88033 | A1 | 11/2001 |
| WO | 02/36338 | A1 | 5/2002 |
| WO | 03/089221 | A1 | 10/2003 |
| WO | 03089221 | A1 | 10/2003 |
| WO | 03097405 | A2 | 11/2003 |
| WO | 2005/077634 | A2 | 8/2005 |
| WO | 2005/113689 | A1 | 12/2005 |
| WO | 2008/065049 | A1 | 6/2008 |
| WO | 2009/049886 | A1 | 4/2009 |
| WO | 2009/053462 | A1 | 4/2009 |
| WO | 2009049886 | A1 | 4/2009 |
| WO | 2009/117376 | A1 | 9/2009 |
| WO | 2010/060241 | A1 | 6/2010 |
| WO | 2011/134943 | A1 | 11/2011 |
| WO | 2011/147872 | A1 | 12/2011 |
| WO | 2012/078729 | A1 | 6/2012 |

OTHER PUBLICATIONS

PCT International Search Report & Written Opinion dated May 28, 2013; Appln. No. PCT/US2013/030477.

Japanese Office Action dated Aug. 6, 2013; Appln. No. 2011-500887.

International Preliminary Report on Patentability dated Jun. 2, 2010; Appln. No. PCT/US2009/037337.

European Office Action dated May 13, 2014; Appln. No. 09721697.2.

European Office Action dated May 16, 2013; Appln. No. 09721697.2.

Japanese Office Action dated May 26, 2012; Appln. No. 2011-500887.

Japanese Office Action dated Jul. 11, 2013; Appln. No. 2011-500887.

PCT Written Opinion of the International Preliminary Examining Authority dated Jan. 31, 2013; Appln. No. PCT/US2011/063698.

International Search Report and the Written Opinion of the International Searching Authority dated Mar. 14, 2012; Appln. No. PCT/US2011/063698.

International Preliminary Report on Patentability dated Mar. 28, 2013; Appln. No. PCT/US2011/063698.

International Search Report and Written Opinion dated May 21, 2013; Appln. No. PCT/US2013/030457.

International Search Report and Written Opinion dated Mar. 14, 2012; for Corresponding PCT Application No. US 2011/063698 filed Dec. 7, 2011.

Chinese Office Action dated Sep. 26, 2011; Appln. No. 200980109337.3.

Peter Born; Bernd Mayer Structural Bonding in Automotive Applications.

Gregory W. Hopton; Philip E. Weber; Leslie J. Osenkowski; Gerald J.Renaud, Application of a Structural Reinforcing Material to Improve Vehicle NVH Characteristics.

Kurt Lilley; Eric Seifferlein; Anita Zalobsky Comparison of Preformed Acoustic Baffles and Two-Component Polyurethane Foams for Filling Body Cavities.

Kurt M. Lilley; Michael J. Fasse; Philip E. Weber A Comparison of NVH Treatments for Vehicle Floorplan Applicaitons.

Kurt M. Lilley; Phil E. Weber Vehicle Acoustic Solutions.

Chinese Office Action dated Jan. 6, 2016; Application No. 201380030189.2.

* cited by examiner

PARTIAL-FILLED BAFFLE

TECHNICAL FIELD

The present invention relates generally to a baffling and/or sealing member that includes an expandable material and a carrier with voids and spaced-apart members formed of varying materials to reduce weight, material, and cost, and to improve sound attenuation characteristics.

BACKGROUND

The transportation industry continues to require methods of baffling and sealing that provide improved sound attenuation and also reduced weight and at a reduced cost. Often, when attempting to reduce the weight of a part providing baffling and/or sealing, the lightweight nature of the support material fails to provide the desired sound attenuation and/or sealing capabilities. Thus, reduced functionality often accompanies lightweight sealing and baffling mechanisms. Traditionally, a baffle including a full coverage open cell foam and a correspondingly shaped carrier to support the foam provide an improved acoustic seal. However, the full coverage nature of such parts make them heavy and more expensive and may be met with assembly issues. It would therefore be desirable to form a carrier and an associated foam that is not a full coverage device and yet provides improved acoustic and sealing capabilities comparable to those of full coverage devices.

There is thus a need in the art of sealing for low weight sealing and baffling assemblies that provide improved sealing and sound attenuation characteristics and are easily assembled while minimizing weight, material, and cost.

SUMMARY OF THE INVENTION

The present invention meets the aforementioned needs by providing a baffle comprising a carrier having an interior body portion with a plurality of spaced apart members providing voids and a peripheral rim substantially surrounding the interior body portion. The device further includes a thermally expandable sealing material disposed on the carrier in an amount and of a material sufficient for thermally expanding to fill a vehicle cavity and cover the interior body portion and each of the voids.

The expandable material may be a material that is elastically deformable without rupture for forming a mechanical interconnection with a wall of a cavity of a vehicle. The carrier may be a continuous surface that is substantially free of protuberances. The expandable material may be attached to a face of the carrier. The end of the carrier and end of the expandable material may not be co-extensive. The expandable material may extend laterally to a portion short of a terminating edge of the carrier. The expandable material may extend to a location that is at least 1 mm from a terminating edge of the carrier. The baffle may include a fastener formed as a nylon clip integrally formed with the carrier. The baffle may be formed in a two step molding process in a rotary mold. The baffle may be formed by a die-cutting process. The baffle may be formed by processing steps that are free of any die-cutting process. An edge of the carrier may be formed surrounding each void and the expandable material located about the voids is not co-extensive with the edge of the carrier surrounding each void. The expandable material may be co-extensive with the peripheral rim of the carrier. The carrier and expandable material may be formed to each include the same number of voids. The carrier and expandable material may be formed to include differing numbers of voids. The carrier may be formed with at least four voids.

The teachings herein further contemplate a method for forming the baffles described herein comprising die cutting the carrier to form the voids in the carrier and die cutting the expandable material to form the voids in the expandable material so that the voids in the carrier material and the voids in the expandable material are located in corresponding locations with one another. The method may further include a step of locating the expandable material in direct planar contact with the carrier so that the voids in the expandable material are in an overlying relationship with the voids of the carrier. The method may include a step of locating the baffle within a vehicle cavity. The method may include a step of exposing the expandable material to heat so that the expandable material expands.

The invention herein contemplates a baffle for the sealing of cavities with a carrier having an interior body portion with a plurality of spaced-apart members providing voids and one or more expandable sealing materials.

DETAILED DESCRIPTION

Figure 1:
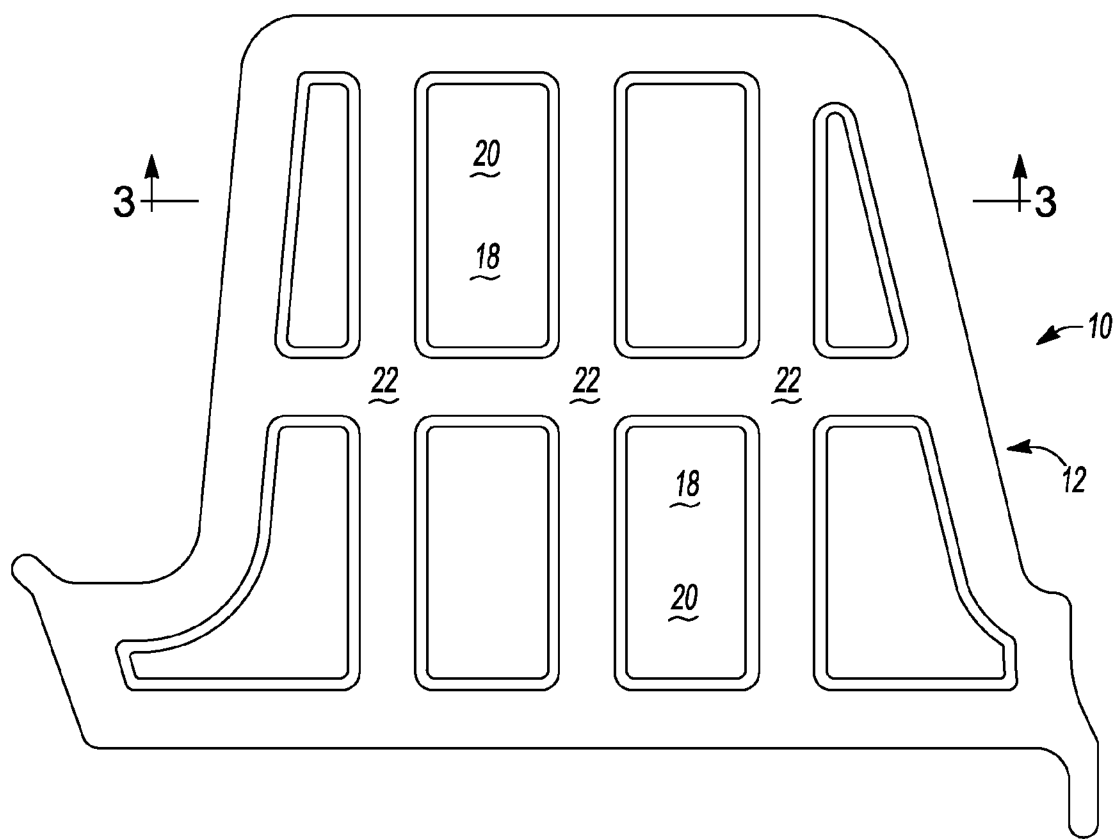
FIG. 1 shows a top down view of an illustrative example of the baffle structure of the present invention.

The explanations and illustrations presented herein are intended to acquaint others skilled in the art with the invention, its principles, and its practical application. Those skilled in the art may adapt and apply the invention in its numerous forms, as may be best suited to the requirements of a particular use. Accordingly, the specific embodiments of the present invention as set forth are not intended as being exhaustive or limiting of the teachings. The scope of the teachings should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

This application is related to and claims the benefit of the priority date of U.S. Provisional Application Ser. No. 61/657,262, filed on Jun. 8, 2012. The entirety of that application is hereby incorporated by reference for all purposes.

The present invention allows for improved baffling and sealing of a cavity using substantially less material than a traditional baffle by providing voids in one or more of the carrier and the expandable material. The baffle disclosed herein may include one or more sealing materials in addition to the carrier and expandable material, which may or may not also include voids. The voids in the expandable material, if present, may be formed so that they correspond in size and location with the voids of the carrier. During expansion, the one or more expandable materials may expand in one or more directions to substantially cover the voids in the carrier.

The resulting baffle surprisingly provides sufficient sealing comparable to that of baffles including a full coverage carrier while using only a partial coverage carrier. Thus, formation of a baffle in accordance with the present teachings surprisingly includes less carrier materials and expandable materials, but provides a sealing device having full coverage of expandable material, partial coverage of carrier material and yet sufficient sound attenuation and sealing. However, despite existence of the voids in the carrier, the location of the spaced apart members of the carrier must provide sufficient support for the expandable material. As such, the distance between adjacent spaced apart member of the carrier must not be so large that the expandable material either pre or post expansion is likely to sag within the voids.

The size of the baffle may depend upon the size of the cavity in which the baffle is located. The baffle, comprising the carrier and expandable material by virtue of the voids formed therein, is contemplated to cover no more than 80%, no more than 70%, no more than 60%, or even no more than 50% of a cross section of the cavity, prior to expansion of the expandable material. The voids formed in the baffle, thus, may represent at least 20%, at least 30%, at least 40%, or even at least 50% of the cavity prior to expansion of the expandable material. The thickness of the baffle may be at least about 0.1 mm. The thickness of the baffle may be less than about 10 mm. The thickness of the carrier and expandable material may be from about 0.5 mm to about 6 mm. The thickness of the expandable material may be at least about 0.01 mm. The thickness of the expandable material may be less than about 8 mm. The thickness of the expandable material may be from about 0.2 mm to about 5 mm.

The adjacent spaced apart members of the carrier may be arranged so that the distance between adjacent members is equal. The adjacent spaced apart members of the carrier may be arranged so that the distance between adjacent members is not equal. The spaced apart members may be arranged substantially parallel to one another. The spaced apart members may be arranged substantially perpendicular to one another. The spaced apart members may form a grid configuration. The distance between adjacent spaced apart members may be at least about 0.25 mm. The distance between adjacent spaced apart members may be at least about 0.5 mm. The distance between adjacent spaced apart members may be at least about 1.0 mm. The distance between adjacent spaced apart members may be at least about 3.0 mm.

The size and shape of the voids or openings formed in the carrier material may vary or may be substantially similar. The voids at their largest diameter may be at least about 1 mm, at least about 2 mm, or even at least about 4 mm. The voids are their smallest diameter may be at least about 0.05 mm, at least about 0.1 mm or even at least about 0.2 mm. The voids may be substantially rectangular in shape, substantially triangular in shape, or substantially rounded in shape. The shape, size, and number of the voids may vary depending upon the size of the baffle. For example, a smaller baffle (e.g., a baffle having a largest diameter of 2 mm or less) may include three voids or less, whereas a larger baffle (e.g., a baffle having a largest diameter of at least about 10 mm), may have 4 voids, 6 voids, 8 voids 10, voids or more.

The carrier may comprise a substantially planar polymeric substrate. The carrier may include a variety of materials such as polymers, elastomers, fibrous materials (e.g., cloth or woven materials), thermoplastics, plastics, nylon, and combinations thereof. The carrier may be injection molded in a multi-shot injection molding process. The carrier may be die-cut. The carrier may also comprise a substantially planar metallic substrate such as steel. The surface of the carrier may be continuous and substantially free of protuberances.

The expandable material may be attached to a face of the carrier. It is contemplated that the end of the expandable material and the end of the carrier may or may not be co-extensive. The end of the carrier may be any location at which the carrier material does not extend further. Thus the end of the carrier may be an end located adjacent the peripheral edge or an end located adjacent a void. It is thus contemplated that the end of the expandable material and the end of the carrier may be co-extensive at one or more ends of the carrier and may not be co-extensive at one or more ends of the carrier. It is further contemplated that the expandable material may extend laterally to a position short of a terminating edge of the carrier or may extend to a position that is equal to the extension of the terminating edge of the carrier. Again, a terminating edge may be any carrier edge where the carrier material does not extend further. The material may extend to a location that is at least 1 mm from a terminating edge of the carrier. The material may extend to a location that is at least 0.5 mm from a terminating edge of the carrier. The material may extend to a location that is at least 0.25 mm from a terminating edge of the carrier.

Figure 3:
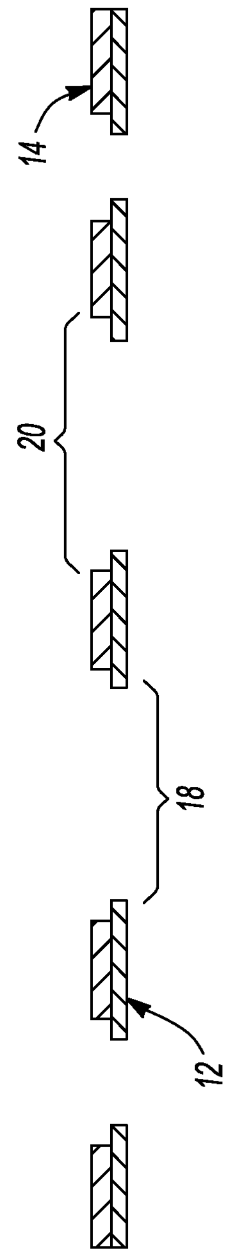
FIG. 3 shows a cross-sectional view of the baffle structure of FIG. 1 at line A.

The expandable material may also include one or more openings (e.g., voids), as shown for example in FIGS. 1 and 3, and the voids may be present so as to reduce the amount of material required to effectively seal a cavity, thereby reducing the weight and cost of the baffle. Further, the presence of less than full coverage expandable material may result in more uniform expansion and coverage of the baffle upon expansion of the expandable material. The expandable material may expand to fill the vehicle cavity and cover the interior body portion and each of the voids in the carrier. The baffle may include edges, slots, or attachments that guide the expansion of the expandable sealing material and thus prevent the expandable material from covering the one or more openings.

After placement of the baffle into a cavity, the expandable sealing materials may expand according to a predetermined set of conditions. For example, exposure to certain levels of heat may cause the expandable materials to expand. The volumetric expansion of the expandable materials may vary depending upon the sealing and/or baffling needs of a particular cavity. The expandable material may expand to fill the vehicle cavity and cover the voids in the interior body portion of the carrier. The expandable material may expand at least about 100%. The expandable material may expand less than about 2000%. The expandable material may expand at least about 500%, at least about 1000%, or more. The expandable material may expand less than about 1000% or even less than about 500%.

The expandable sealing materials may be generally dry to the touch or tacky and may be shaped in any form of desired pattern, placement, or thickness, but is preferably of substantially uniform thickness. Though other heat-activated materials are possible for the expandable sealing materials, a preferred heat activated material is an expandable polymer or plastic, and preferably one that is foamable. The expandable sealing materials may be relatively high expansion foams having a polymeric formulation that includes one or more of an epoxy resin, an acetate (e.g. ethylene vinyl acetate), a thermoplastic polyether, an acrylate and/or a methacrylate (e.g., a copolymer of butyl acrylate and methyl acrylate), an epoxy/elastomer adduct, and one or more fillers (e.g., a clay filler, and/or a nanoparticle-containing filler). Preferred thermally expandable materials are disclosed in U.S. Pat. Nos. 7,313,865; 7,125,461; and 7,199,165 incorporated by reference herein for all purposes. For example, and without limitation, the foam may also be an EVA/rubber based material, including an ethylene copolymer or terpolymer that may possess an alpha-olefin. As a copolymer or terpolymer, the polymer is composed of two or three different monomers, i.e., small molecules with high chemical reactivity that are capable of linking up with similar molecules. Suitable expandable materials include those available from L&L Products, Inc. under the designations L7220, L2821, L1066, L205, L2010, L2105, L2108A, L2806, L2811, L4200, L4141, L4161, L4315, L5510, L5520, L5540, L5600, L5601, 17102, and L7104. The expandable materials may be die cut extruded sheets of material. They may be co-injection molded with the carrier in a multi-shot injection molding process.

A number of baffling or sealing foams may also be used for the expandable sealing materials. A typical foam includes a polymeric base material, such as one or more ethylene-based polymers which, when compounded with appropriate ingredients (typically a blowing and curing agent), will expand and cure in a reliable and predictable manner upon the application of heat or the occurrence of a particular condition. From a chemical standpoint for a thermally-activated material, the foam is usually initially processed as a flowable material before curing, and upon curing, the material will typically cross-link making the material incapable of further flow.

The expandable material can be formed of other materials provided that the material selected is heat-activated or otherwise activated by an ambient condition (e.g. moisture, pressure, time or the like) and cures under appropriate conditions for the selected application. One such material is the epoxy based resin disclosed in U.S. Pat. No. 6,131,897, the teachings of which are incorporated herein by reference. Some other possible materials include, but are not limited to, polyolefin materials, copolymers and terpolymers with at least one monomer type an alpha-olefin, phenol/formaldehyde materials, phenoxy materials, and polyurethane materials with high glass transition temperatures. Additional materials may also be used such as those disclosed in U.S. Pat. Nos. 5,766,719; 5,755,486; 5,575,526; and 5,932,680, incorporated by reference herein for all purposes.

In applications where the expandable material is a heat activated material, an important consideration involved with the selection and formulation of the material is the temperature at which a material cures and, if expandable, the temperature of expansion. Typically, the material becomes reactive (cures, expands or both) at higher processing temperatures, such as those encountered in an automobile assembly plant, when the material is processed along with the automobile structures at elevated temperatures or at higher applied energy levels, e.g., during coating (e.g., e-coat, paint or clearcoat) curing steps. While temperatures encountered in an automobile assembly operation may be in the range of about 148.89° C. to 204.44° C. (about 300° F. to 400° F.) for body shop applications (e.g., e-coat) and, for paint shop applications, are commonly about 93.33° C. (about 200° F.) or slightly higher (e.g., 120° C.-150° C.).

The expandable material may be mechanically attached to the carrier. The expandable sealing material may expand to contact one or more cavity walls to seal the cavity and may be bonded to the carrier over its entire surface or a face of the carrier or may be locally bonded to the carrier at selected locations (e.g., using a tacking type attachment).

The baffle may include a fastener such as a tree-fastener or a threaded screw fastener. Alternatively, the baffle may be substantially free of any fastener. The fastener may also be provided in a variety of shapes and in a variety of configurations so long as it can secure the sealing device to a cavity. One example of a suitable fastener is disclosed in U.S. Publication No. 2010/0021267 incorporated by reference herein for all purposes. The fastener may be capable of securing multiple layers or types of materials to a structure. Examples of suitable fasteners include mechanical fasteners, clips, tabs, press-fits, snap-fits, screws, hooks, combinations thereof or the like. Furthermore, it is contemplated that the one or more fasteners may be formed integral of a singular material with the carrier, such as a nylon clip integrally formed with the carrier, or material of the sealing device, or may be formed of a different material and may be removably attached to the carrier. The fastener may be provided as a magnetic material or an adhesive material that can attach (e.g., adhere or magnetically secure) the sealing device to a cavity. In such an embodiment, the magnetic material or the adhesive material may be interspersed within the first sealing material or the second sealing material. Alternatively, the magnetic material or the adhesive material may be disposed upon the first sealing material and/or the second sealing material or may be otherwise connected to the first sealing material, the carrier and/or the second sealing material.

The baffle may include fastening devices for attaching the expandable material to the carrier. Such devices may be integrally formed with the carrier or attached separately. Such devices may include slots, troughs, extension members, or any other shape that may be formed in or attached to the carrier for receiving or connecting to the expandable material.

Figure 2:
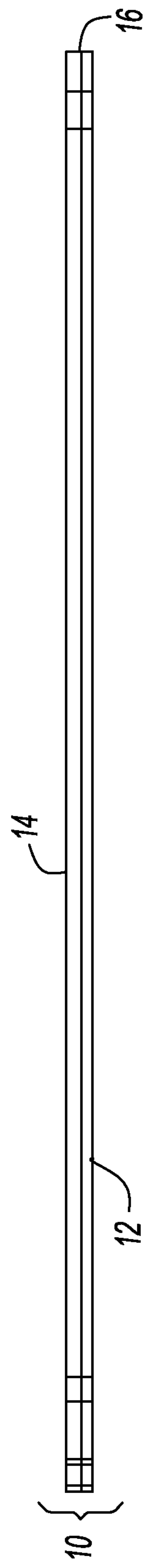
FIG. 2 shows a side profile view of the baffle structure of FIG. 1.

FIG. 1 shows a baffle structure 10 including a carrier 12. The carrier 12 may include a plurality of spaced apart members 22 to form voids 18. From a side profile view as shown in FIG. 2, the carrier 12 and an expandable material 14 lie in direct planar contact with one another along at least the peripheral rim 16 of the carrier 12. As shown in FIGS. 1 and 3, the expandable material 14 may include one or more openings (e.g., voids) 20. As shown in FIG. 3, the expandable material 14 may extend only over a portion of the carrier 12. The voids 18 formed in the carrier and the voids 20 formed in the expandable may be formed so that they correspond with one another in location, size and shape as shown in FIGS. 1 and 3.

The baffle of the present invention may be installed into an automotive vehicle although it may be employed for other articles of manufacture such as boats, buildings, furniture, storage containers or the like. The baffle may be used to seal and/or baffle a variety of components of an automotive vehicle including, without limitation, body components (e.g., panels), frame components (e.g., hydroformed tubes), pillar structures (e.g., A, B, C or D-pillars), bumpers, roofs, bulkheads, instrument panels, wheel wells, floor pans, door beams, hem flanges, vehicle beltline applications, doors, door sills, rockers, decklids, hoods or the like of the automotive vehicle.

Formation of the materials of the present invention may include a variety of processing steps depending on the desired configuration of the materials. The baffle may be formed using a two step molding process in a rotary mold and/or a die cutting process. The processing steps may also be free of any die-cutting process. One or more of the carrier and the expandable material may be formed in an injection molding process which may be a multi-shot injection molding process. Additional processing and formation steps may not be required. The formation and processing may thus be free of any extrusion process.

Any numerical values recited herein include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, preferably from 20 to 80, more preferably from 30 to 70, it is intended that values such as 15 to 85, 22 to 68, 43 to 51, 30 to 32 etc. are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner. As can be seen, the teaching of amounts expressed as "parts by weight" herein also contemplates the same ranges expressed in terms of percent by weight. Thus, an expression in the Detailed Description of the Invention of a range in terms of at "'x' parts by weight of the resulting polymeric blend composition" also contemplates a teaching of ranges of same recited amount of "x" in percent by weight of the resulting polymeric blend composition."

Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints.

The disclosures of all articles and references, including patent applications and publications, are incorporated by reference for all purposes. The term "consisting essentially of" to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist essentially of the elements, ingredients, components or steps. By use of the term "may" herein, it is intended that any described attributes that "may" be included are optional.

Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps.

It is understood that the above description is intended to be illustrative and not restrictive. Many embodiments as well as many applications besides the examples provided will be apparent to those of skill in the art upon reading the above description. The scope of the invention should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. The omission in the following claims of any aspect of subject matter that is disclosed herein is not a disclaimer of such subject matter, nor should it be regarded that the inventors did not consider such subject matter to be part of the disclosed inventive subject matter.

The invention claimed is:

1. A method for forming a baffle comprising:

die cutting a carrier to form voids in the carrier;

die cutting an expandable material to form voids in the expandable material so that the voids in the carrier and the voids in the expandable material are located in corresponding locations with one another; and locating the expandable material in direct planar contact with the carrier so that the voids in the expandable material are in an overlying relationship with the voids of the carrier, wherein the expandable material, once in planar contact with the carrier, does not cover the voids of the carrier prior to expansion of the expandable material.

2. The method of claim 1, including locating the baffle within a vehicle cavity.

3. The method of claim 1, including exposing the expandable material to heat so that the expandable material expands.

4. The method of claim 1, including forming the carrier as a continuous surface that is substantially free of protuberances.

5. The method of claim 1, including attaching the expandable material to a face of the carrier.

6. The method of claim 1, including locating the expandable material onto the carrier so that it is not co-extensive with the carrier.

7. The method of claim 1, including locating the expandable material onto the carrier so that it does not extend to a terminating edge of the carrier.

8. The method of claim 1, including locating the expandable material onto the carrier so that it extends to a location less than 1 mm from a terminating edge of the carrier.

9. The method of claim 1, including forming a fastener as a nylon clip integrally formed with the carrier.

10. The method of claim 1, including forming the baffle in a two-step molding process in a rotary mold.

11. The method of claim 1, including forming the baffle by a die-cutting process.

12. The method of claim 1, wherein the baffle is formed by processing steps that are free of any die-cutting process.

13. The method of claim 1, including forming an integrally formed or separately formed tab, adhesive, post, pow-tab, or any combination thereof for attachment of the expandable material to the carrier.

14. The method of claim 1, including forming in the carrier, the expandable material, or both an integrally formed or separately formed tab, adhesive, post, pow-tab, or any combination thereof for attachment of the baffle to a wall of a vehicle cavity.

15. The method of claim 1, including forming an edge of the carrier to surround each void and locating the expandable material about the voids that is not co-extensive with the edge of the carrier surrounding each void.

16. The method of claim 1, wherein the expandable material is co-extensive with a peripheral rim of the carrier.

17. The method of claim 1, including forming the carrier and the expandable material to each include the same number of voids.

18. The method of claim 1, including forming the carrier and the expandable material to include differing numbers of voids.

19. The method of claim 1, including forming the carrier with at least four voids.

* * * * *